Apr. 17, 1923.
F. S. HAMILTON
LOCK NUT
Filed March 3, 1920
1,452,422
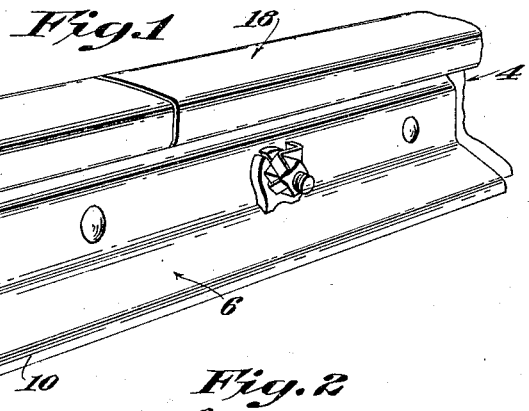
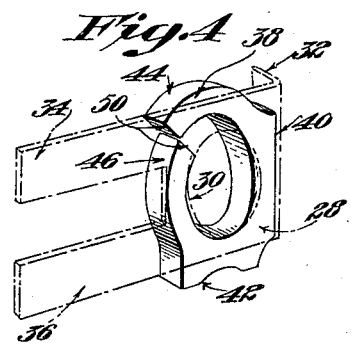
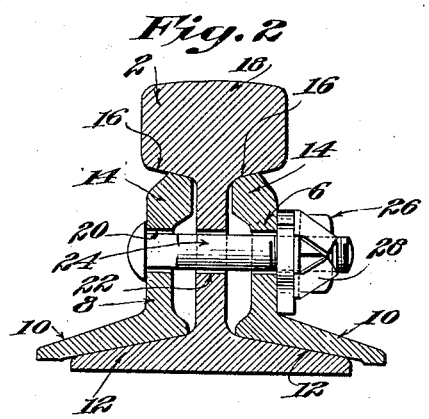
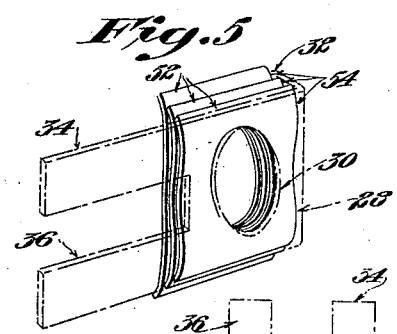
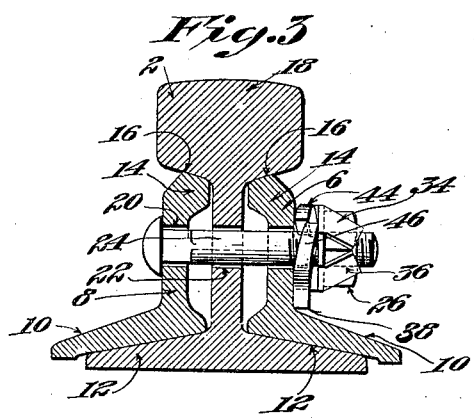
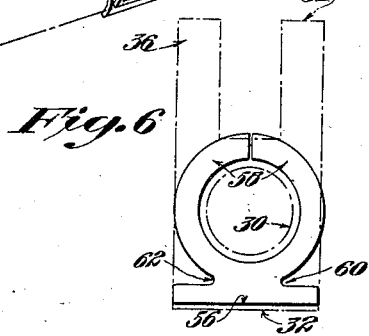
Inventor
Frank S. Hamilton
by Mitchell, Chadwick & Kent
Attorneys Patented Apr. 17, 1923.

1,452,422

UNITED STATES PATENT OFFICE.

FRANK S. HAMILTON, OF BOSTON, MASSACHUSETTS.

LOCK NUT.

Application filed March 3, 1920. Serial No. 363,050.

*To all whom it may concern:*

Be it known that I, FRANK S. HAMILTON, a citizen of the United States, residing at Boston, in the county of Suffolk and State of Massachusetts, have invented certain new and useful Improvements in Lock Nuts, of which the following is a specification.

This invention relates to improvements in anchor plates for nut locks. More particularly it is designed for use in connection with rail joints. Numerous devices have heretofore been suggested for locking the nuts on the bolts which pass through the rail and splicing plates, to prevent rotation of such nuts; but difficulty is experienced owing to variations in the setting which said nuts ought to have under the varying conditions of railroad experience. It is found, for example, that the bolts stretch so that a nut which was tight ceases to perform well its function of holding the rails tightly even though it has been held perfectly non-rotatable by its nut lock. Also, inasmuch as the splicing plates have bases which engage the bases of the rails on bevelled surfaces after the manner of wedges, and the repeated passage of trains causes wear, it is found that wear makes a relatively large increment of looseness at the bolt. Changes also occur as a result of weather and temperature conditions which make a different setting of the nut desirable. It is the object of the present invention to provide means which will automatically maintain the rail joint with a properly tight setting of nut, although held secure against rotation by its nut lock, notwithstanding the stretch in the bolt, or looseness that would otherwise occur from wear or weather, and yet will not be made seriously tighter by any differential expansion result from temperature changes. These objects are accomplished by providing powerful spring-elastic characteristic in the nut locking means, operable in the direction of the axis of the bolt. In the form in which this is illustrated, the nut locking means consists of two parts, both of which are washers on the bolt, and one being an anchor plate non-rotatably engaging the splicing plate and the other being a strap transmitting the anchoring effect to the nut; and in this type the anchor plate is, according to the invention, made of spring-elastically variable thickness. In the specific form illustrated, as an example, the anchor plate is an annular piece of thick spring metal strung on the bolt with the annulus cut at one place and the two ends thus made separated from each other laterally, that is, in the direction perpendicular to the plane of the annulus, but capable of being brought back into a single plane by sufficiently powerful compression, as by the screwing up of the nut on the bolt. The over-all thickness of the anchor plate may, for example, be one-half an inch, the plate being made of one-quarter inch stock, and each part offset one-eighth inch from the position which it occupies when the anchor plate is flat. When the nut is screwed tight, this plate becomes flat; and when any looseness subsequently develops the spring-elasticity of the plate causes it to split as much as necessary up to a maximum of one-quarter inch, which is enough to accommodate all conditions likely to occur in practice, so far as I am informed.

The invention will be made clear by reference to the accompanying drawings, in which Fig. 1 is a perspective view of a rail joint illustrating the use of the invention;

Figure 2 is a transverse sectional view taken in the vertical plane through the bolt;

Figure 3 is an exaggerated view similar to Fig. 2, illustrating the spring action of the anchor plate;

Figure 4 is a perspective view of the anchor plate shown in Figs. 1, 2 and 3, the lock washer being indicated in dot-and-dash lines;

Figure 5 is a view similar to Fig. 4 showing a modified form of anchor plate; and Figure 6 is a view of a preferred form of anchor plate.

The invention is for illustrative purposes shown in Figs. 1, 2, and 3 as applied to a rail joint comprising two rails 2 and 4 joined together by splicing plates 6 and 8. The splicing plates are provided with laterally projecting base flanges 10 adapted to rest upon bevelled base flanges 12 of the rail and with head portions 14 adapted to engage the under faces 16 of the head 18 of the rail. The splicing plates 6 and 8 are provided with the openings 20 through which and through corresponding openings 22 in the rail may be mounted bolts 24. The base flanges 10 and the head portions 14 are wedged in upon the flanges and faces which they engage, as shown in Fig. 2, nuts 26 being threaded upon the bolts to secure the rails and the splicing plates together. In order to prevent rotative movement of the nuts upon the bolts, lock washers 28 are employed. Though the invention is not limited thereto, the lock washers illustrated are of the type disclosed in my co-pending application, Serial No. 315,754, filed August 6, 1919, and comprise plate members having openings 30, through which the bolts may extend, flanges 32 adapted to engage anchor plates, hereinafter to be described, to prevent relative rotative movement of the anchor plates and the lock washers, and fingers 34 and 36 adapted to be bent into engagement with a face or faces of the nut to prevent relative rotative movement of the nut and the lock washer. When the bolt stretches, or when, for any of the other reasons enumerated above, the bolt becomes loose, the lock washer tends to become free to move relatively to the nut, causing the splicing plates to be no longer held tightly to the rails, resulting in a loose rail joint with all the attendant defects of loose joints.

This undesirable result is prevented, according to the present invention, through the provision of a self adjusting or take-up anchor plate constituted of spring metal of great strength and having a laterally offset or displaced portion or portions that are adapted to engage the lock washer and the splicing plate respectively and, through the spring action of the metal, to take up the slack caused by the looseness in the joint. The metal may, for example, be steel one-fourth inch thick and the anchor capable of expansion to a thickness of one-half inch. The lock washer is thus maintained in effective engagement with the nut and the joint is maintained tight. The anchor plate shown in Figs. 2, 3, and 4 comprises an annular perforated spring metal plate 38 having an edge 40 that is adapted to be engaged by the flange 32 of the lock washer for a purpose explained above and a bottom edge 42, extending from the edge 40, that is adapted to rest upon or engage the base flanges 10 to prevent rotative movement of the anchor plate relatively to the splicing plate. Spring arms 44 and 46 extend from the free ends of the edges 40 and 42, respectively, and are laterally offset or displaced, as shown more particularly in Figs. 3 and 4. A convenient method of manufacture is to cut a previously stamped plate along the line 50 and then to separate the cut ends thus formed laterally, i. e., in a direction parallel to the axis, by suitable oppositely applied forces. The separated cut portions preferably are not sharp, the spring effect alone, and not the biting action of sharp edges, being desired. Employing an anchor plate of this character, if the joint shown in Fig. 2 were made up with the offset ends pressed by the nut into the same plane with the edges 40 and 42 thereof, and if the parts thus joined should vary in dimension, as, for example, in the event that the splicing plates should wear down, the strong action of the spring arms 44 and 46 will take up of the slack, as shown in Fig. 3 maintaining the lock washer in effective position relatively to the nut and maintaining the joint as tight as before.

The invention is not limited to anchor plates of the specific type thus far described, however, and two additional types of anchor plates are illustrated in Figs. 5 and 6. The anchor plate of Fig. 5 comprises a plurality of perforated, preferably rectangular sheet metal bow spring plate 52 registering together and of successively diminished length. The corresponding edges 54 of the plates 52 are adapted to perform the function of the edges 40 of the above described anchor plate, preventing relative rotative movement of the anchor plate and the lock washer by engaging the lock washer flange 32. The slipping of the individual spring plates upon one another increases the spring action. By employing a plurality of plates, furthermore, it is possible to use thinner and more effective spring metal and as many plates may be chosen as are necessary for the purpose in hand.

The elongated edge 56 of the anchor plate shown in Fig. 6, may perform the double function of engaging the flange 32 of the lock washer and serving as a rotation arresting edge to engage the base flange 10. Laterally offset spring arms 58 extend upwardly from the edge 56 and, like the spring arms 44 and 46, are adapted to engage the splicing plate 6 and the lock washer to take up the slack in the joint and thus maintain the splicing plates tightly in position upon the rail. In order to increase the length and, therefore, the possible amplitude of the bending of the spring arms, they are made to extend from points 60 and 62 between the ends of the edge 56.

If the thickness of anchor plate is equal to the total distance of loosening which the device is designed to prevent, the flange of the lock washer may be of the same extent. It will then set close to the vertical web of the splice plate when the nut is tightened overlapping the whole thickness of the anchor plate, and will overlap half of the same even when the anchor plate is fully expanded, because only one-half of the expansion thereof occurs on each side. It is to be observed that the amplitude of stretch of bolt illustrated is greater than will occur in practice, except rarely, but that even in such cases the lock washer is by the spring maintained against the nut, and so the nut is effectively restrained from rotation. Such lateral play of rails as may be made possible by the bolt stretch is restrained by a very strong resistance, that of the thick metal spring which ordinarily will prevent all lateral movement of one rail, with respect to the other; but if any such movement at all should occur it will be limited positively by the nut which owing to the device of the invention cannot unscrew.

Though illustrated as made of spring plate metal, it will be obvious that the anchor plate of Fig. 6 may be manufactured of other suitable material as, for example, thick spring wire, round or flat, bent into the desired shape.

I claim as my invention:

1. The combination with a bolt and a nut threaded thereon adapted to clamp a non-rotatable body, of means for locking said nut against rotation upon the bolt; said locking means comprising a lock washer having fingers adapted to be bent to one side of its plane into engagement with a face of the nut, to lock said nut and washer together, and having a flange on the opposite side of said plane; an anchor plate around said bolt between said washer and the non-rotatable body, having an edge adapted to engage the said flange to prevent rotation of the nut with respect to the plate, and having an edge for engaging the non-rotatable body whereby the plate is held against rotation; the portion of the anchor plate surrounding the bolt being split and its sections bent oppositely to exert pressure axially along the bolt to hold the clamp taut.

2. The combination with a bolt and a nut threaded thereon adapted to clamp a non-rotatable body, of means for locking said nut against rotation upon the bolt; said locking means comprising a flanged washer having arms bendable into engagement with said nut to lock it and the washer together; and a spring anchor plate adapted to prevent rotation of said washer and to exert pressure axially to maintain the clamp taut; the said plate being of uniform thickness, having an elongated edge arranged to engage the surface of the non-rotatable body to prevent said plate from rotating, and having a pair of arms extending from said edge around said bolt, and bent oppositely from the plane of the plate for transmitting the axial pressure.

3. The combination with a bolt and a nut threaded thereon adapted to clamp a non-rotatable body, of means for locking said nut against rotation upon the bolt; said locking means comprising a washer having fingers bendable into engagement with said nut to lock it and the washer together and having a flange adapted to rest against the surface of the non-rotatable body; and an anchor plate having an elongated edge adapted to engage said flange and hold it against the said surface, thereby preventing rotation of said washer, and having arms extending from said edge around said bolt; said arms being bent oppositely from the plane of the plate and being adapted to exert pressure axially of the bolt to hold said clamp taut.

4. A spring anchor plate for a nut lock having an edge adapted to engage the surface of an adjacent non-rotatable element and to be thereby prevented from rotating, the said plate also having means, which may be the same edge, to prevent rotative movement of a lock washer with respect thereto, and having a spring arm extending from said edge with substantially undiminished thickness around a recess provided for the bolt and being there offset from the plane of said edge and being elastically compressible into substantially the plane of said edge.

5. A spring-metal anchor plate for a nut lock having an edge adapted to be engaged by a lock washer, an edge extending from the first-named edge adapted to prevent rotative movement of the anchor plate, and two spring arms respectively extending from the free ends of the edges, and completing the circuit around the axis without diminution of thickness, one of the spring arms being adapted to engage the lock washer to maintain it in effective proximity to a nut.

6. The combination with a bolt and a nut threaded thereon adapted to clamp a non-rotatable body having a flanged portion projecting outward therefrom, of means for locking said nut against rotation upon the bolt; said locking means comprising a lock washer adapted to engage said nut to lock said nut and washer together, and an anchor plate around said bolt engaging said washer to prevent relative rotation between them; said anchor plate having an edge engaging the flanged portion of the non-rotatable body whereby the anchor plate is held against rotative movement.

7. The combination with a bolt and a nut threaded thereon adapted to clamp a non-rotatable body having a flanged portion projecting outward therefrom, of means for locking said nut against rotation upon the bolt; said locking means comprising a lock washer adapted to engage said nut to lock said nut and washer together, and an anchor plate around said bolt engaging said washer to prevent relative rotation between them; said anchor plate having an edge engaging the flanged portion of the non-rotatable body whereby the anchor plate is held against rotative movement, and being expansible along the axis of the bolt whereby it exerts pressure axially thereof to maintain the clamp taut.

Signed at Boston, Massachusetts, this 20th day of February, 1920.

FRANK S. HAMILTON.